(12) United States Patent
Thacker et al.

(10) Patent No.: US 8,769,964 B2
(45) Date of Patent: Jul. 8, 2014

(54) SYSTEM AND METHOD FOR COOLING SYNGAS PRODUCED FROM A GASIFIER

(75) Inventors: Pradeep S. Thacker, Bellaire, TX (US); Paul Steven Wallace, Katy, TX (US)

(73) Assignee: General Electric Company, Schenectady, NY (US)

(*) Notice: Subject to any disclaimer, the term of this patent is extended or adjusted under 35 U.S.C. 154(b) by 1080 days.

(21) Appl. No.: 12/652,659

(22) Filed: Jan. 5, 2010

(65) Prior Publication Data
US 2011/0162381 A1 Jul. 7, 2011

(51) Int. Cl.
*F02C 3/28* (2006.01)

(52) U.S. Cl.
USPC .............. 60/801; 60/780; 60/783; 165/157; 165/183; 48/67; 122/7 R; 122/53; 122/198

(58) Field of Classification Search
CPC ........ C10J 3/485; C10J 2300/165; C10J 3/86; Y02E 20/16; F22B 1/1846; F22B 1/1838; F02C 6/18; F02C 3/28
USPC ............. 60/780, 783, 800, 801; 48/89, 127.9, 48/61, 67, 198.3, 76, 77, 78; 165/157, 165/183; 122/53, 161, 198, 7 R, 32, 33
See application file for complete search history.

(56) References Cited

U.S. PATENT DOCUMENTS

| | | | | |
|---|---|---|---|---|
| 2,928,730 A | * | 3/1960 | Luerssen | 75/491 |
| 4,377,132 A | * | 3/1983 | Koog et al. | 122/7 R |
| 4,481,014 A | * | 11/1984 | Dorling | 48/76 |
| 4,678,480 A | * | 7/1987 | Heinrich et al. | 48/197 R |
| 4,841,917 A | * | 6/1989 | Premel | 122/379 |
| 4,876,987 A | * | 10/1989 | Martin et al. | 122/504.2 |
| 5,632,933 A | | 5/1997 | Yeoman et al. | |
| 5,713,312 A | | 2/1998 | Waryasz | |
| 6,960,234 B2 | | 11/2005 | Hassett | |
| 2007/0186473 A1 | | 8/2007 | Wallace | |
| 2008/0034657 A1 | * | 2/2008 | Van Den Berg et al. | 48/62 R |
| 2008/0166278 A1 | | 7/2008 | Goller et al. | |
| 2008/0175769 A1 | | 7/2008 | Goller et al. | |
| 2008/0175770 A1 | | 7/2008 | Wallace | |
| 2009/0047193 A1 | | 2/2009 | Corry et al. | |
| 2009/0074638 A1 | | 3/2009 | Harned et al. | |
| 2009/0166975 A1 | | 7/2009 | Russell et al. | |
| 2009/0173484 A1 | | 7/2009 | Storey | |
| 2009/0199474 A1 | | 8/2009 | Leininger et al. | |
| 2009/0274594 A1 | | 11/2009 | Guo et al. | |
| 2010/0088959 A1 | * | 4/2010 | Meyer et al. | 48/62 R |

FOREIGN PATENT DOCUMENTS

| | | |
|---|---|---|
| CN | 101438119 A | 5/2009 |
| WO | 91/10106 A1 | 7/1991 |

OTHER PUBLICATIONS

PCT Search Report issued in connection with corresponding WO Patent Application No. US10/060758 filed on Dec. 16, 2010.
Chinese Office action dated Mar. 7, 2014, for Application Serial No. 2014030400517440, 30 pages.

* cited by examiner

*Primary Examiner* — Phutthiwat Wongwian
*Assistant Examiner* — Steven Sutherland
(74) *Attorney, Agent, or Firm* — Armstrong Teasdale LLP

(57) ABSTRACT

A syngas cooler that includes an outer wall defining a cavity. A first membrane water wall is positioned within the cavity. A thermal siphon is positioned between the first membrane water wall and the outer wall and is configured to channel a flow of syngas therethrough to facilitate cooling the channeled syngas.

20 Claims, 7 Drawing Sheets

SYSTEM AND METHOD FOR COOLING SYNGAS PRODUCED FROM A GASIFIER

BACKGROUND OF THE INVENTION

The present disclosure relates generally to integrated gasification combined-cycle (IGCC) power generation and, more specifically, to a method and apparatus for cooling syngas from a gasifier.

At least some known IGCC power generation systems use gasifiers that convert hydro-carbonaceous feedstock into a partially oxidized gas. The partially oxidized gas, known as "syngas," is used to fuel at least some combustion turbines. However, before the syngas can be used, generally impurities such as entrained solids, carbon dioxide, and/or hydrogen sulfide must be removed from the syngas.

Known IGCC power generation systems produce syngas at a high temperature. To remove entrained solids, at least some known power operation systems cool the syngas using radiant and convection syngas coolers. Known coolers recover heat from syngas, thus reducing the syngas temperature to enable entrained solids to drop out of the syngas stream in the form of slag and particulate matter. After cooling and removing slag and particulate matter, the syngas is at a temperature that is suitable for carbon dioxide and hydrogen sulfide removal. However, known coolers are relatively large and expensive, and require an array of pumps, piping and steel drums to effectively cool the syngas. Moreover, known coolers may require frequent maintenance to avoid fouling problems.

Thus, a need exists for a less expensive, more compact syngas cooler that is resistant to fouling and that does not require large amounts of ancillary equipment. Furthermore, it is expected that energy will become more costly. Thus, there is also a need for cooling equipment with enhanced efficiency and lifespan.

BRIEF DESCRIPTION OF THE INVENTION

In one aspect, a syngas cooler is provided. The syngas cooler includes an outer wall that defines a cavity. A first membrane water wall is positioned within the cavity. A thermal siphon is positioned between the first membrane water wall and the outer wall and is configured to channel a flow of syngas therethrough to facilitate cooling the channeled syngas.

In another aspect, a gas turbine engine system is provided. The gas turbine engine system includes a compressor and a combustor in flow communication with the compressor to receive at least some of the air discharged by the compressor. A syngas cooler is coupled in flow communication with the combustor for channeling a flow of syngas to the combustor. The syngas cooler includes an outer wall that defines a cavity. A first membrane water wall is positioned within the cavity. A thermal siphon is positioned between the first membrane water wall and the outer wall and is configured to channel a flow of syngas therethrough to facilitate cooling the channeled syngas.

In a further aspect, a method for cooling syngas produced in a gasifier and separating slag and particulate matter from the syngas is provided. The method includes surrounding a flow of syngas with three concentric, vertically oriented membrane water walls inside a syngas cooling unit. Cooling fluid is channeled through the three concentric membrane water walls. The syngas is passed down through a first of the three membrane water walls to partially cool the syngas and separate slag and particulate matter from the syngas. A thermal siphon is utilized to pass the partially cooled syngas up between the first of the three membrane water walls and a second of the three membrane water walls and then down between the third of the three membrane water walls and the second of the three membrane water walls to produce cooled output syngas.

BRIEF DESCRIPTION OF THE DRAWINGS

The figures of the drawings are not necessarily drawn to scale. However, corresponding reference characters indicate corresponding parts throughout the drawings.

DETAILED DESCRIPTION

Figure 1:
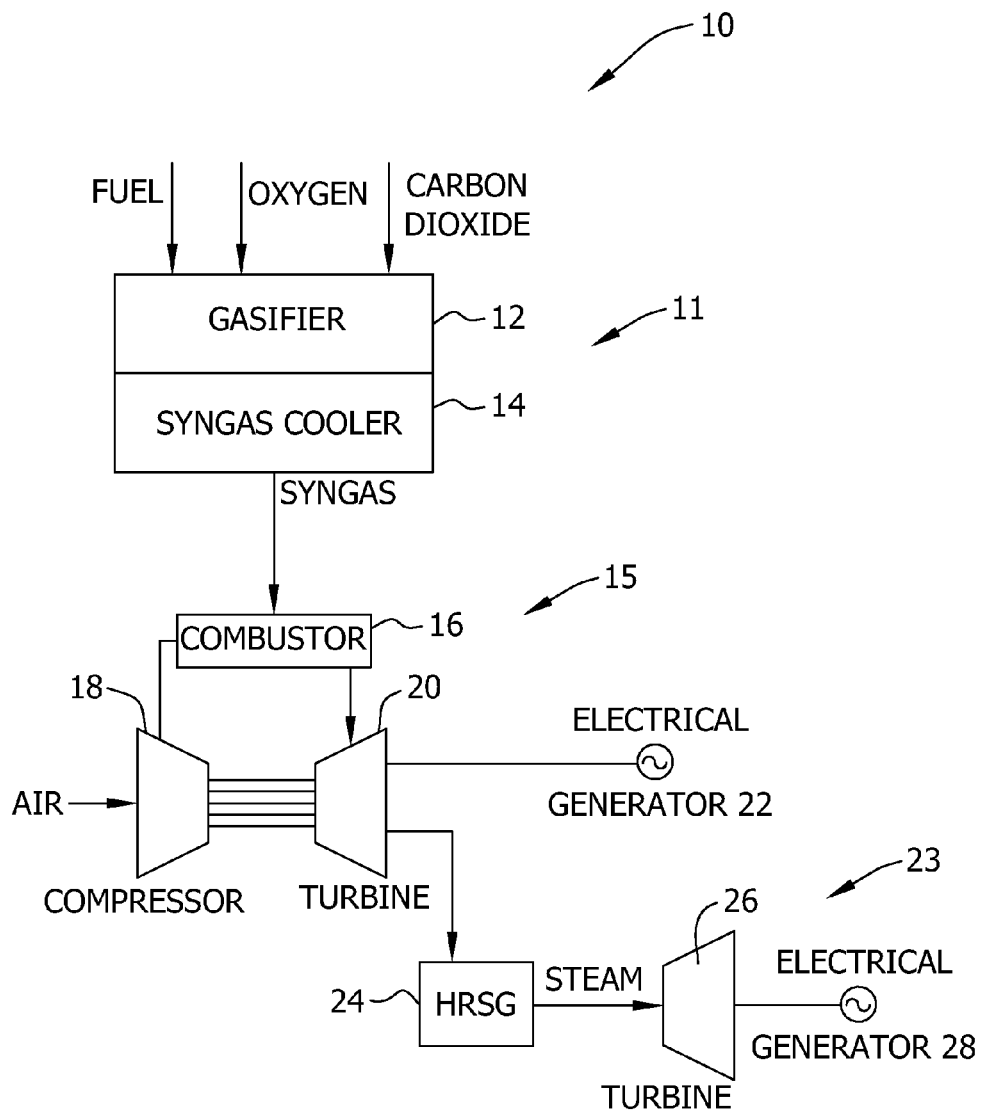
FIG. 1 is a schematic diagram of an exemplary IGCC power generation system.

As used herein, the word "exemplary" is defined as "characteristic of its kind or illustrating a general rule," and not necessarily as "desirable" or "best." Neither individually cited exemplary embodiments nor their drawings shown herein necessarily illustrate all of the inventive features that may be combined in an embodiment. Also, some exemplary embodiments and/or their drawings may show features not inventive by themselves but useful for understanding the context of inventive features.

Moreover, the terms "first," "second," "third," etc., are intended only to distinguish similar types of objects recited in the disclosure and/or shown in the drawings. They are not meant to imply a numerical ordering for the corresponding objects or any indication of time or quality unless explicitly stated. Moreover, the presence of a "first," a "second," or a "third" object in an embodiment does not necessarily imply the existence of any other similar objects in that particular embodiment. For example, an embodiment having a "first" wall does not necessarily have a "second" such wall. Similarly, an embodiment having a "second" wall does not necessarily have a "first" such wall.

As used herein, the term "syngas" refers to synthesis gas made from partially oxidized hydro-carbonaceous feedstock. Syngas varies in its exact composition based on the feedstock used, but comprises mainly carbon monoxide, hydrogen, water, carbon dioxide and possibly impurities such as hydrogen sulfide. Syngas is used as fuel in combustors of at least some IGCC plants.

FIG. 1 illustrates an exemplary IGCC power generation system 10 that includes an integrated syngas cooler system 11, a gas turbine engine system 15, and a steam turbine engine system 23. Gas turbine engine system 15 includes a compressor 18, a combustor 16, a turbine 20 drivingly coupled to compressor 18 and to a first electrical generator 22. Combustor 16 is coupled to compressor 18 such that combustor 16 is in flow communication with compressor 18. Steam turbine engine system 23 includes a heat recovery steam generator (HRSG) 24, a steam turbine 26 and a second electrical generator 28. In the exemplary embodiment, integrated syngas cooler system 11 includes a gasifier 12 and a syngas cooler 14. Gasifier 12 partially oxidizes fuel such as coal, refinery residues, petroleum coke, residual oil, oil emulsions, tar sands or other hydro-carbonaceous feedstock to make syngas. Integrated syngas cooler system 11 is coupled to combustor 16 such that integrated syngas cooler system 11 is in flow communication with combustor 16 for channeling a flow of syngas to combustor 16. Combustor 16 burns the syngas as fuel to produce hot, high pressure gas. Compressor 18 draws in and compresses air. Hot, high pressure gas from combustor 16 and compressed air from compressor 18 are mixed together and channeled towards turbine 20. As the combustion gases expand, turbine 20 is rotated to power first electrical generator 22. HRSG 24 produces steam using waste heat from turbine 20. HRSG 24 supplies the steam to turbine 26, which powers second electrical generator 28.

In many cases, the hydro-carbonaceous feedstock contains impurities such as ash, metal and minerals. Syngas generated from feedstock containing such impurities often contains solid impurities in the form of entrained slag and particulate matter. Thus, in some embodiments, the present invention separates slag and particulate matter from the syngas, before carbon dioxide and hydrogen sulfide removal, to avoid plugging and fouling. The syngas is at a high temperature when discharged from gasifier 12. To facilitate the removal of slag and particulate matter, the syngas is cooled by syngas cooler 14, after leaving gasifier 12 and before the syngas enters combustor 16.

Figure 2:
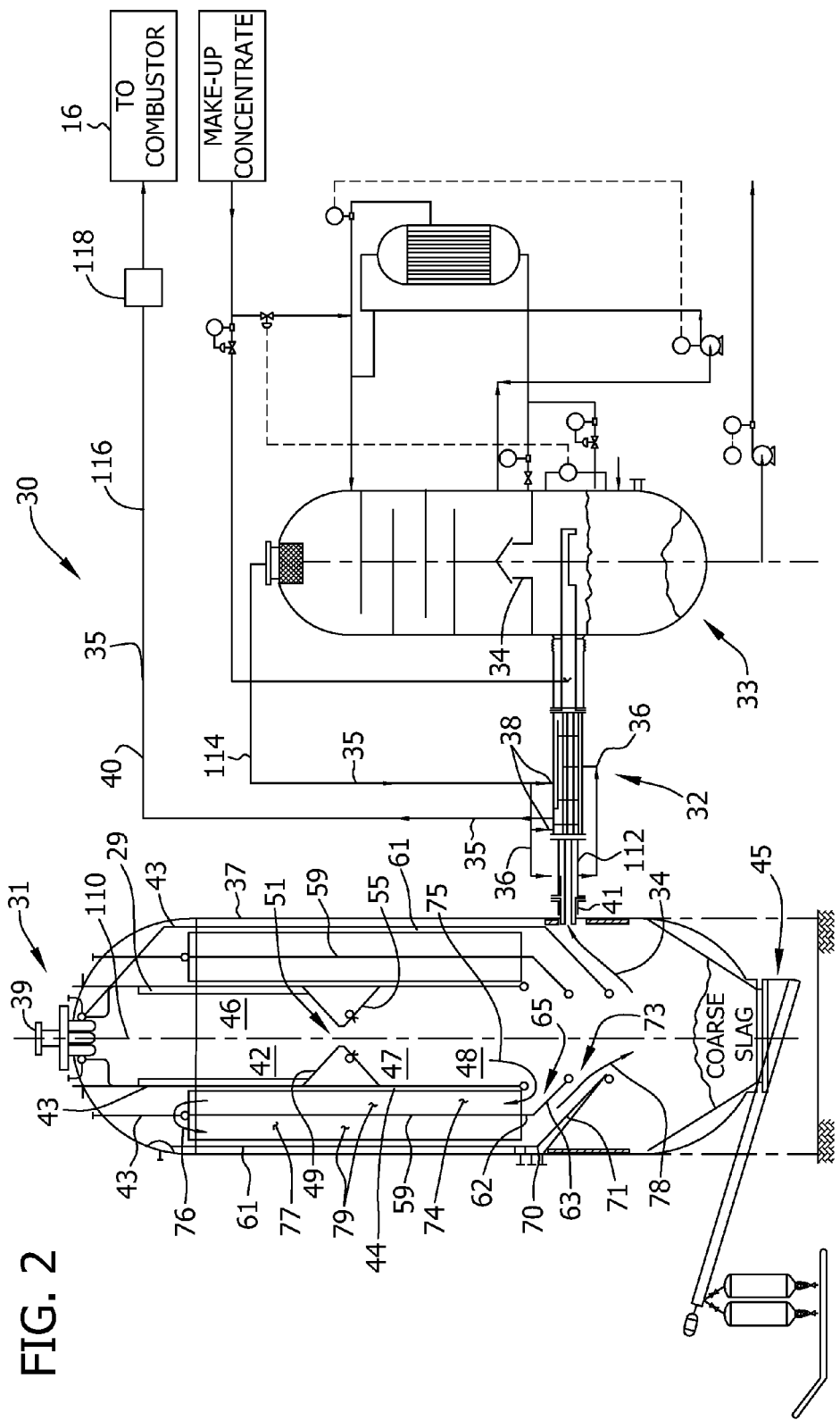
FIG. 2 is a schematic diagram of an exemplary syngas cooler system for use in the IGCC power generation system shown in FIG. 1.
Figure 3:
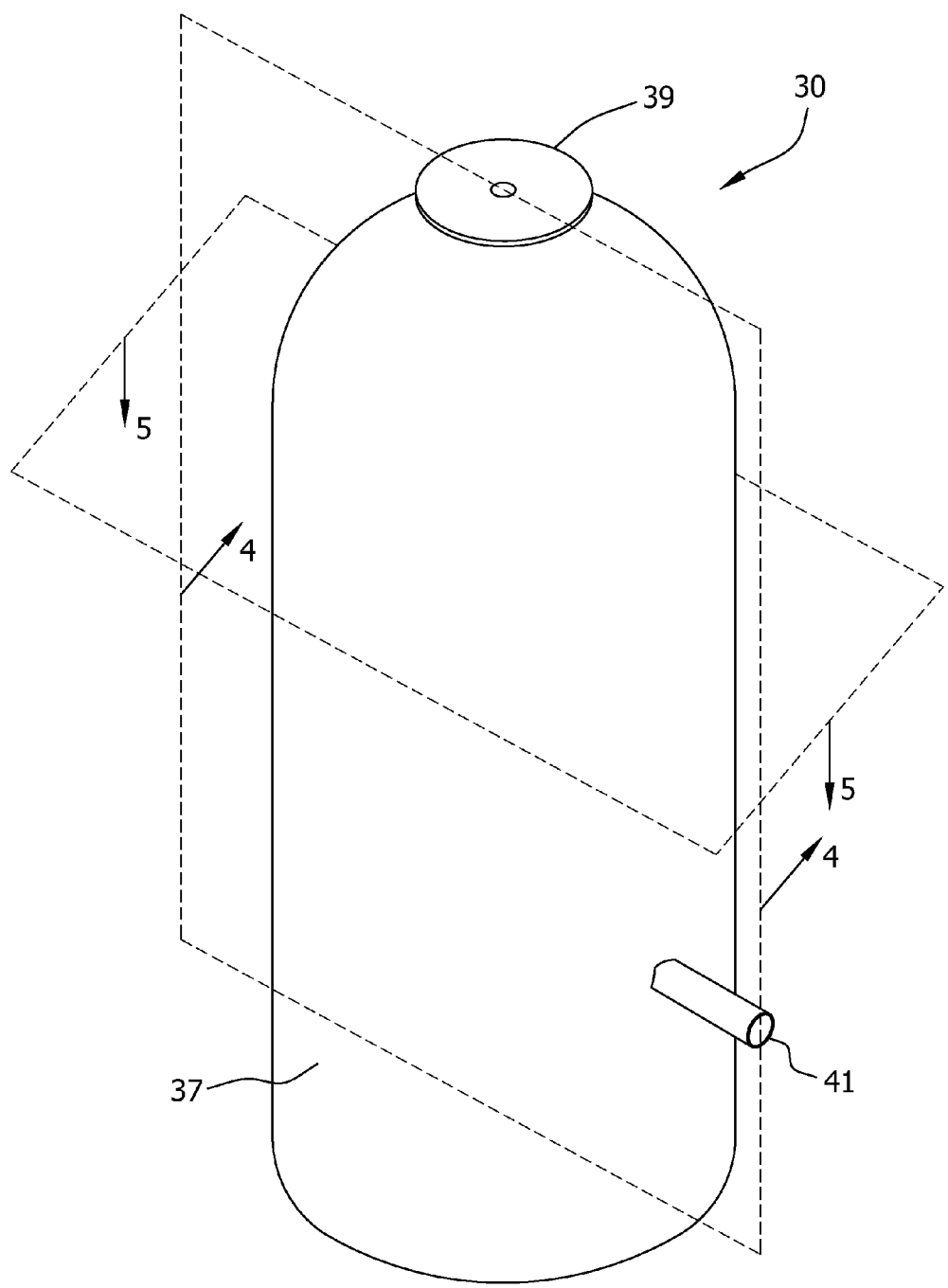
FIG. 3 is an isometric view of an exemplary syngas cooler for use in the syngas cooler system shown in FIG. 2.
Figure 4:
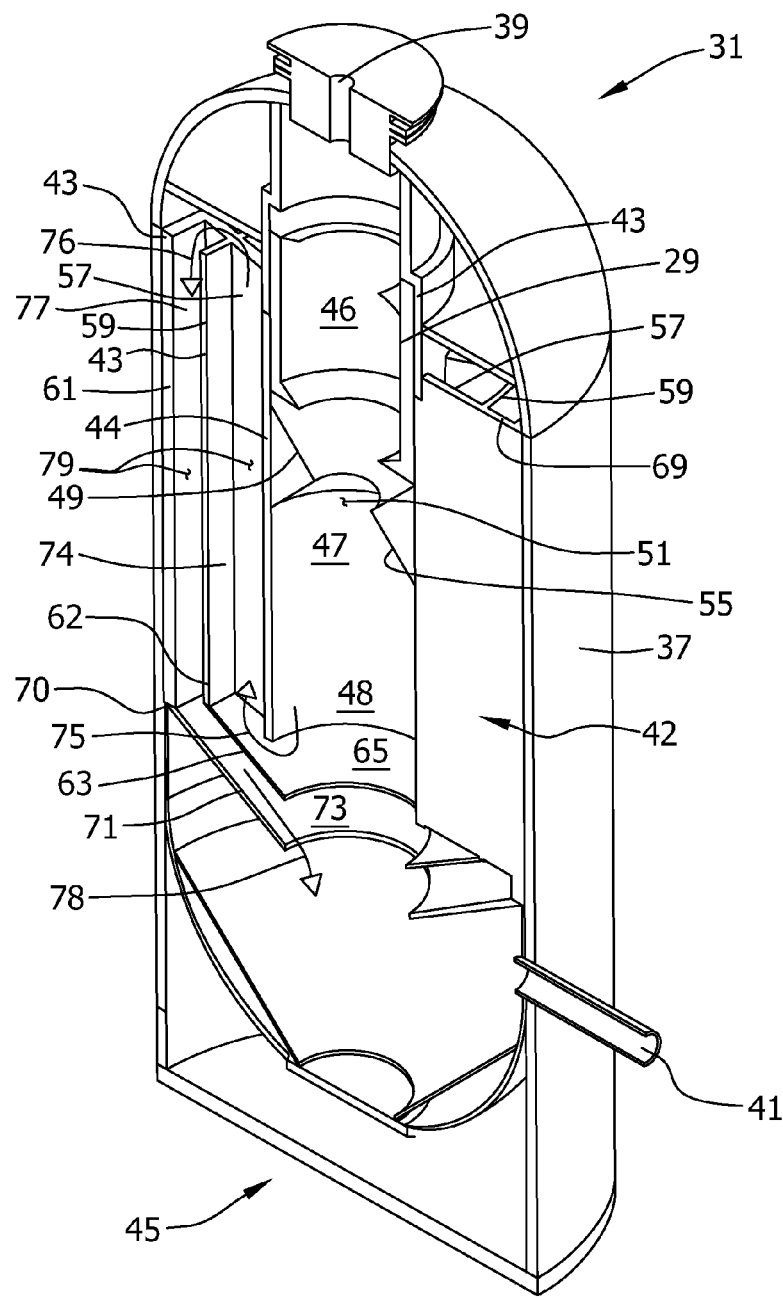
FIG. 4 is a cut-away isometric view of the syngas cooler shown in FIG. 3 and taken along Line 3-3.

FIG. 2 is a schematic diagram of a syngas cooler system 30 for use in IGCC power generation system 10. FIG. 3 is an isometric view of a syngas cooler 31 for use in syngas cooler system 30. FIG. 4 is a cut-away isometric view of syngas cooler 31. Identical components shown in FIG. 3 and FIG. 4 are labeled with the same reference numbers used in FIG. 2. In the exemplary embodiment, syngas cooler system 30 includes a gasifier 29 positioned within syngas cooler 31, a heat exchanger 32 coupled to syngas cooler 31, and a syngas scrubber 33 coupled to syngas cooler 31 and heat exchanger 32. A transfer line 112 is coupled between syngas cooler 31 and heat exchanger 32. A first, or scrubbed syngas conduit 114 is coupled to syngas scrubber 33, transfer line 112, and heat exchanger 32 for channeling a flow of scrubbed syngas from syngas scrubber 33 to transfer line 112 and heat exchanger 32. A second, or heated scrubbed syngas conduit 116 is coupled between heat exchanger 32 and combustor 16 for channeling a flow of heated scrubbed syngas from heat exchanger 32 to combustor 16. In one embodiment, a gas cleaning system 118 is coupled between heat exchanger 32 and combustor 16 for cleaning a flow of heated scrubbed syngas from heat exchanger 32.

During operation of syngas cooler system 30, coal and oxygen are channeled into gasifier 29 to facilitate production of syngas. Gasifier 29 channels syngas through syngas cooler 31 for reducing a temperature of the syngas. A first syngas flow 34 is channeled from syngas cooler 31 to transfer line 112 and to heat exchanger 32 for heating a second, or scrubbed syngas flow 35 from syngas scrubber 33. Heat exchanger 32 further cools first syngas flow 34 by facilitating a transfer of heat from first syngas flow 34 to second syngas flow 35. In an alternative embodiment, heat exchanger 32 facilitates heating a flow of boiler feed water by facilitating a transfer of heat from first syngas flow 34 to the boiler feed water to generate high pressure steam. Heat exchanger 32 channels the syngas to syngas scrubber 33 to scrub the syngas with water to facilitate removing particulates and chlorides.

More specifically, heat exchanger 32 channels first syngas flow 34 to syngas scrubber 33 for facilitating removal of particulates and chlorides from first syngas flow 34. Syngas scrubber 33 channels a first portion 36 of scrubbed second syngas flow 35 to transfer line 112 to facilitate reducing a metal temperature in transfer line 112 and to facilitate preventing fouling of and solids deposition within transfer line 112 and heat exchanger 32. Syngas scrubber 33 further channels a second portion 38 of scrubbed syngas flow 35 to heat exchanger 32. A small amount of dry, heated recycled syngas gas is then mixed with the scrubbed syngas to desaturate (superheat) the syngas and to dry any carryover solids to facilitate eliminating solid deposition in heat exchanger 32. Second syngas flow 35 includes syngas with a substantially reduced flow of particulates and chlorides. As second syngas flow 35 enters heat exchanger 32, heat from first syngas flow 34 is transferred to second syngas flow 35. First portion 36 is further channeled from transfer line 112 to heat exchanger 32 to be mixed with second portion 38 and heated. Heat exchanger 32 channels a third, or heated scrubbed syngas flow 40 towards combustor 16 for use in combustion. In one embodiment, heat exchanger 32 channels third syngas flow 40 to gas cleaning system 118.

In the exemplary embodiment, syngas cooler 31 includes a syngas cooler outer wall 37 that defines a cavity 42, a feed injector 39, a cooled syngas outlet 41, and a plurality of membrane water walls 43 positioned within cavity 42. Gasifier 29 is contained within syngas cooler 31 and is positioned in a top section 46 of a first membrane water wall 44, also known as an inner membrane water wall. Feed injector 39 is configured to channel a flow of fuel, such as coal or other carbonaceous material, and oxygen to gasifier 29. Gasifier 29 facilitates the production of syngas and channels the syngas through syngas cooler 31. Hot syngas from gasifier 29 is circumscribed by, and enters through, first membrane water wall 44. First membrane water wall 44 is substantially cylindrical and is substantially centered about a vertical centerline 110 through gasifier 29 and syngas cooler 31, such that at least most slag contained in the hot syngas falls downward and is collected at a lockhopper 45 coupled to syngas cooler outer wall 37. In the exemplary embodiment, first membrane water wall 44 contains a plurality of tubes or passages (not shown) through which cooling fluid circulates. The syngas and cooling fluid are not in direct contact, although heat from the syngas is transferred to the cooling fluid through radiation and convection as the syngas is channeled through first membrane water wall 44. In some embodiments, first membrane water wall 44 is fabricated at least partially from a high alloyed material (for example, Incology 800 LC) to facilitate preventing high temperature sulfidation and corrosion. First membrane water wall 44 includes top section 46, a second or mid section 47, and a third or lower section 48. In one embodiment, top section 46 and/or gasifier 29 is coated with a ramming mix refractory layer such as, but not limited to, a chromium or silicone carbide (SiC) based material.

In the exemplary embodiment, mid section 47 includes a first obliquely oriented wall 49 that defines a passage 51 inside first membrane water wall 44. First wall 49 defines a passageway that terminates in passage 51 that is narrower at its lower end than at its upper end, such that an area/diameter ratio and a more uniform resident time distribution for the syngas and slag passing therethrough are each facilitated to be increased. As a result, the amount of coarse slag is facilitated to be increased. In the exemplary embodiment, first wall 49 is fabricated from refractory brick to facilitate withstanding the high temperature syngas. In other embodiments, a decreased water wall radius may be achieved by removing tubes (not shown in the Figures) from first membrane water wall 44. A second obliquely oriented wall 55 below passage 51 defines a passageway that is narrower at its upper end than at its lower end. In the exemplary embodiment, first wall 49 and second wall 55 are each fabricated from refractory brick to facilitate withstanding the high temperature syngas.

In the exemplary embodiment, a second membrane water wall 59, also known as a middle membrane water wall, circumscribes first membrane water wall 44 inside syngas cooler 31. As such, second membrane water wall 59 has a larger diameter than first membrane water wall 44. Second membrane water wall 59 includes a plurality of first radial wing walls 57 that extend radially inwardly to support second membrane water wall 59 and that couple to first membrane water wall 44. First radial wing wall 57 can be of any size, shape, dimension and number, without departing from the scope of this disclosure. For example, in the exemplary embodiment, more than fifteen first radial wing walls 57 are used. In another embodiment, more or less than fifteen first radial wing walls 57 are used. In still other embodiments, more or less than fifteen first radial wing walls 57 are used.

Also, in the exemplary embodiment, a third membrane water wall 61, also known as an outer membrane water wall, circumscribes second membrane water wall 59 inside syngas cooler 31. Third membrane water wall 61 is substantially similar to second membrane water wall 59 but has a larger diameter than water wall 59. Third membrane water wall 61 in some embodiments is supported against syngas cooler outer wall 37. Also, third membrane water wall 61 includes second radial wing walls 69 that extend radially inwardly to support third membrane water wall 61 and that couple to second membrane water wall 59. The number, size, and dimensions of second radial wing walls 69 can vary between embodiments, but in some embodiments, the same number of first radial wing walls 57 and second radial wing walls 69 are used such that each walls 57 and 69 are aligned in the same radial pattern. In some embodiments, first membrane water wall 44, second membrane water wall 59, and third membrane water wall 61 are substantially concentrically aligned.

In the exemplary embodiment, a plurality of first uncooled baffles 63 extends from a bottom 62 of second membrane water wall 59. Baffles 63 are oriented inwardly to define a first lower passage 65. Also, in the exemplary embodiment, a plurality of second uncooled baffles 71 extends from a bottom 70 of third membrane water wall 61. Baffles 71 are oriented inwardly to define a second lower passage 73. Lockhopper 45 is positioned below second lower passage 73 to collect coarse slag falling from the syngas stream, while the cooled syngas is channeled from syngas cooler 31 through syngas outlet 41. Lockhopper 45 is maintained with a level of water that quenches the flowable slag into a brittle solid material that may be broken into smaller pieces when removed from syngas cooler 31. The cooled syngas discharged from syngas outlet 41 may contain fine slag particles, which can be removed with additional processing. Substantially all of the coarse slag is removed via lockhopper 45.

Syngas entering syngas cooler 31 through gasifier 29 is substantially cooled by flowing downward along first membrane water wall 44. Passage 51, located at or substantially near a center of first membrane water wall 44, facilitates concentrating the slag stream into the center of first membrane water wall 44 to promote recirculation of the syngas. In contrast to the coarse slag, which falls under the force of gravity into lockhopper 45, partially cooled syngas flows in an upwardly direction 75 into an annular space 74 divided by first radial wing walls 57 and defined between first membrane water wall 44 and second membrane water wall 59. This syngas is further cooled and flows in a downwardly direction 76 into an annular space 77 divided by second radial wing walls 69 and defined between second membrane water wall 59 and third membrane water wall 61. A thermal siphon 79 created by a density difference between the upwelling syngas, indicated by arrow 75 and the downwelling syngas indicated by arrow 78, creates the desired flow pattern (i.e., hot gas rises, cold gas falls). The existence of thermal siphon 79 allows hot, coarse slag to be removed from the syngas while allowing the syngas to be cooled to a temperature that is suitable for carbon dioxide and hydrogen sulfide removal. In the exemplary embodiment, syngas channeled through lower section 48 of first membrane water wall 44 includes a temperature between about 1800° F. to about 1600° F. As syngas flows upwardly through annular space 74 and into thermal siphon 79, the syngas is further cooled, such that syngas entering annular space 77 includes a temperature between about 1300° F. to about 1200° F. Syngas channeled through annular space 77 and through thermal siphon 79 is further cooled, such that syngas entering lower passage 73 includes a temperature between about 1000° F. to about 800° F.

Figure 5:
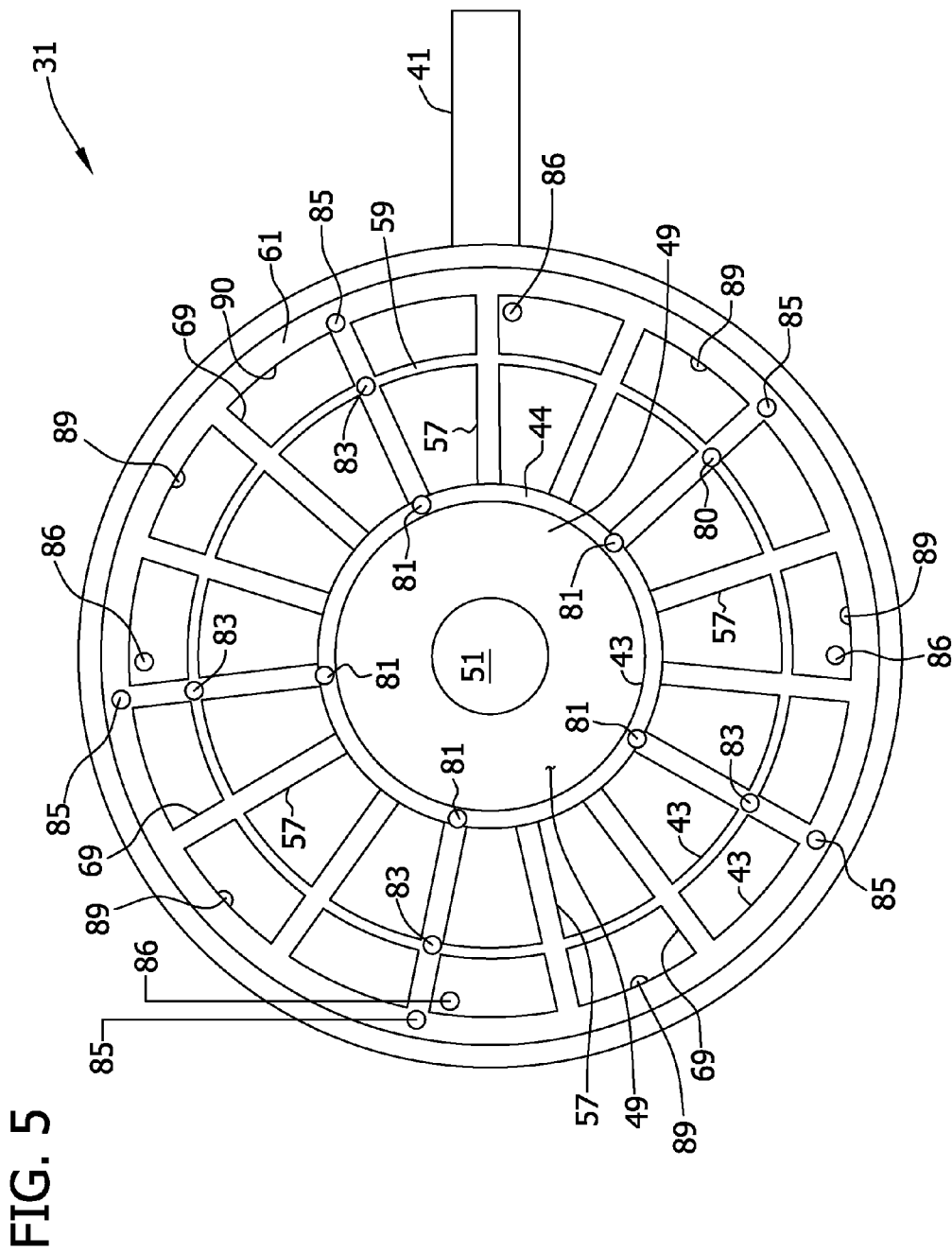
FIG. 5 is a cut-away oblique top view of a portion of the syngas cooler shown in FIG. 3 and taken along Line 4-4.

FIG. 5 is a cut-away oblique top view of a portion of syngas cooler 31 shown in FIG. 3 and taken along Line 4-4. Identical components shown in FIG. 5 are labeled with the same reference numbers used in FIG. 4. In the exemplary embodiment, at least one coolant entry 80 is coupled to at least one membrane water wall 43 for channeling a flow of cooling fluid through membrane water wall 43. In an alternative embodiment, coolant, e.g., water, is supplied to first membrane water wall 44 via one or more first coolant entries 81. Similarly, coolant is supplied to second membrane water wall 59 via one or more second coolant entries 83, and coolant is supplied to third membrane water wall 61 via one or more third coolant entries 85. Although entry points and egress points for steam and coolant are not illustrated on FIGS. 1, 2, and 3, after becoming familiar with the embodiments described herein, one of ordinary skill in the art would be able to choose such entry points and egress points as a design choice. In one embodiment, one or more steam headers 86 extend through passageways (not shown) between either first membrane water wall 44 and second membrane water wall 59, and/or between second membrane water wall 59 and third membrane water wall 61.

Figure 6:
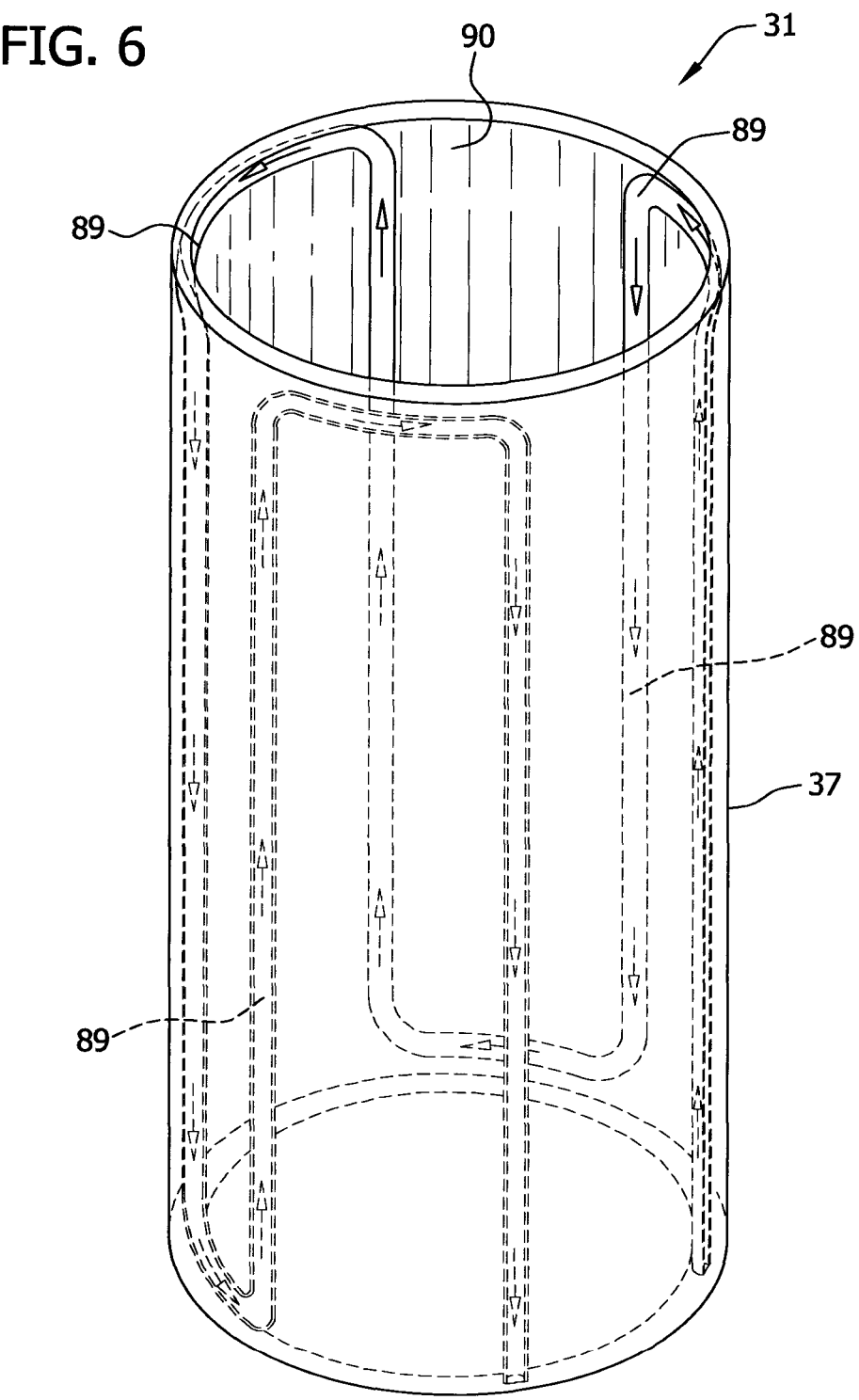
FIG. 6 is an isometric hidden-line view of a half pipe cooling system that is coupled to an outer wall and that may be used with the syngas cooler shown in FIG. 3.

In the exemplary embodiment, and referring to FIG. 6, a plurality of "half pipes" 89 with semicircular cross-sections are positioned on syngas cooler outer wall 37 or may be welded to an interior surface 90 of third membrane water wall 61. In the embodiments using a replacement wall, an outer surface (not shown) of the replacement wall is welded to an interior surface of syngas cooler outer wall 37. In at least one embodiment, half pipes 89 are coolant pipes fabricated from low alloy that is coated with a protective SiC coating. Although not shown in the drawings, in some embodiments, second radial wing walls 69 extend inwardly to couple to second membrane water wall 59. Second uncooled baffles 71 are angled inwardly to form second lower passage 73. In embodiments with a plurality of half pipes 89, coolant circulating in half pipes 89 facilitates cooling the flow of syngas indicated by arrow 78 (shown in FIG. 4).

Figure 7:
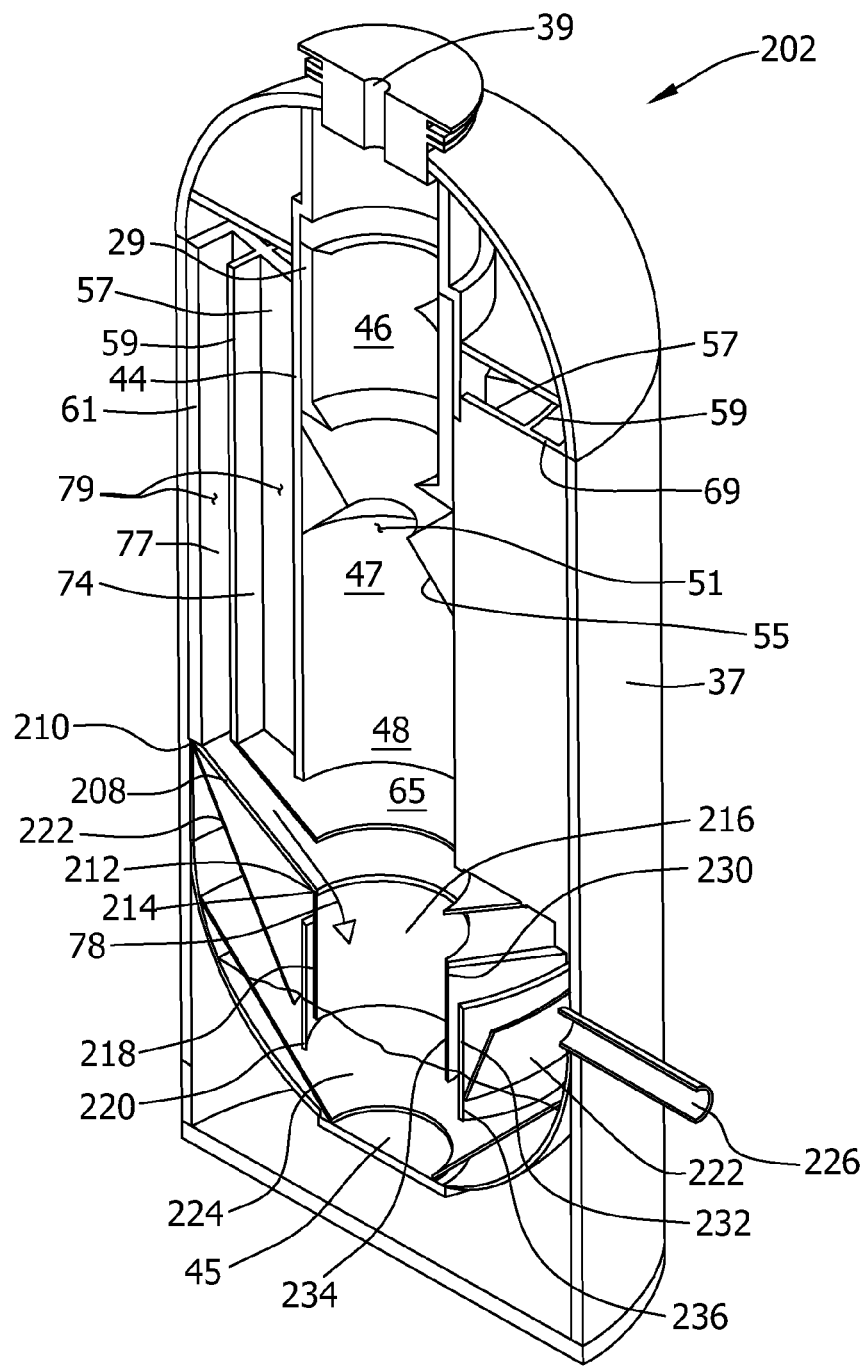
FIG. 7 is cut-away isometric view of an alternative syngas cooler shown in FIG. 3 and taken along Line 3-3.

FIG. 7 is a cut-away isometric view of an alternative syngas cooler 202 for use the IGCC power generation system 10. A quench wall 208 extends downstream from third membrane water wall 61 to define a portion of main syngas flowpath 78. In the exemplary embodiment, quench wall 208 is substantially conical and tapers inward, or converges, from an upstream end 210 towards a downstream end 212. Downstream end 212 is coupled to a quench ring 214 within a quench chamber 216 positioned below second lower passage 73. In the alternative embodiment, quench chamber 216 facilitates the rapid cooling of syngas flowing therethrough. Moreover, in the alternative embodiment, quench chamber 216 includes quench ring 214, a dip tube 218, a draft tube 220, splash plate 222, a water bath 224, and a syngas outlet 226. Although water is described herein as the fluid used to quench the syngas, any suitable non-reactive fluid, such as a liquid and/or a gas, may be used for quenching. In an alternative embodiment, quench ring 214 may be coupled to a sump (not shown), a quench water supply (not shown), and/or any other suitable component that enables syngas cooler 202 to function as described herein.

In an alternative embodiment, dip tube 218 and draft tube 220 are substantially concentrically aligned with centerline 110. An upstream end 230 of dip tube 218 and an upstream end 232 of draft tube 220 are positioned adjacent to quench wall 208. A downstream end 234 of dip tube 218 and a downstream end 236 of draft tube 220 extend into water bath 224. Furthermore, in the exemplary embodiment, splash plate 222 is generally annular and extends about draft tube 220.

Water bath 224 includes, in the exemplary embodiment, water (not shown), a sump (not shown), and/or a blowdown line (not shown). Although water bath 224 is described as having water therein, water bath 224 may include fluids other than water and still be considered a "water bath." Rather, water bath 224 is a portion of quench chamber 216 that is configured to retain water therein. In the exemplary embodiment, dip tube 218 and draft tube 220 are each at least partially submerged in water within water bath 224. In addition, in the exemplary embodiment, quench chamber 216 includes at least one syngas outlet 226 that extends through syngas cooler outer wall 37.

During system operation, syngas produced from gasifier 29 is channeled downward along first membrane water wall 44 through passage 51 and into lower section 48. Second membrane water wall 59 channels partially cooled syngas upwardly into annular space 74 and into thermal siphon 79. As syngas is further cooled, third membrane water wall 61 channels cooled syngas downwardly through annular space 77 and into quench chamber 216. More specifically, third membrane water wall 61 and quench wall 208 channel the syngas into quench chamber 216. Water is channeled into quench ring 214 for discharge into quench chamber 216 along dip tube 218 and into water bath 224. Slag (not shown) formed as the syngas cools falls into water bath 224 for discharge from syngas cooler 202. As the syngas flows through and/or along dip tube 218, draft tube 220, and/or splash plate 222, the particulates within syngas form slag. The remaining syngas is substantially particulate-free and is discharged from syngas cooler 202 through syngas outlet 226. In one embodiment, syngas channeled from syngas cooler 202 through syngas outlet 226 includes a temperature between about 350° F. to about 300° F.

At least some of the advantages of the above-described embodiments include greater heat transfer surface for the syngas, as both sides of first membrane water wall 44 and an additional, second membrane water wall 59 are used for cooling, as well as one side of an additional, third membrane water wall 61 or its replacement with half pipes 89. Thus, much more heat transfer surface density is achieved than is possible in embodiments that include only one membrane water wall. Additionally, the high alloy heat transfer materials are used with greater efficiency because both sides of the high alloy heat transfer surface are used. In addition, slag is disengaged after a first pass through syngas cooler 31, i.e., through first membrane water wall 44 to facilitate minimizing fouling on the second two passes extending through the thermal siphon 79. In addition, a long effective syngas path length defined through syngas cooler 31 with shorter sight lengths promotes heat transfer. The long path length promotes pure plug flow, maximizes syngas temperature, and improves radiant heat transfer. The short sight length also helps heat transfer in the radiant cooler because slag-containing gas is generally opaque. Furthermore, the short sight length helps eliminate a colder zone next to the membrane water walls.

In embodiments in which gasifier 12 is separate from, i.e., not contained within syngas cooler 31, further advantages of the above-described embodiments include using only a minimal size increase in the syngas cooler 31 to achieve cooling, without using an additional cooling system (i.e., pumps, piping, steam drums) in syngas cooler 31, thus reducing costs and improving availability. Furthermore, because of the water cooling, gasifier refractory life is extended, even at higher operating temperatures. Thus, carbon conversion efficiency per pass is improved and the cost of handling fine slag is reduced.

In embodiments in which gasifier 12 is contained within syngas cooler 31, further advantages include the elimination of a need for a transfer line and convective syngas cooler. Although the radiant syngas cooler 31 height is increased, lower cost tubes can be used for the reduced temperature service. The savings from the reduction in footprint and the equipment reduction can more than offset the incremental cost increase of the radiant syngas cooler. In addition, lower alloy tubes can be used for approximately half of the heat transfer surface area, thereby reducing cost and allowing more fabrication options because there is an inner high alloy bundle and an outer low alloy bundle and pressure vessel. Furthermore, all raw syngas is on the shell side in the water tube configuration and all heat transfer surfaces are vertical, thereby reducing or eliminating issues concerning cooler plugging and deposition. Also, there is a low differential pressure on the tubes in the scrubbed syngas section of the syngas cooler, thereby allowing the use of thinner tubes to reduce cost, weight, and heat transfer surface requirements.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

Exemplary embodiments of a system and method for cooling syngas produced from a gasifier are described above in detail. The system and methods are not limited to the specific embodiments described herein, but rather, components of the apparatus and/or steps of the methods may be utilized independently and separately from other components and/or steps described herein. For example, the methods may also be used in combination with other gasifiers and methods, and are not limited to practice with only the syngas cooler system as described herein. Rather, the exemplary embodiment can be implemented and utilized in connection with many other syngas cooling applications.

Although specific features of various embodiments of the invention may be shown in some drawings and not in others, this is for convenience only. In accordance with the principles of the invention, any feature of a drawing may be referenced and/or claimed in combination with any feature of any other drawing.

While the methods and systems described herein have been described in terms of various specific embodiments, those skilled in the art will recognize that the methods and systems described herein can be practiced with modification within the spirit and scope of the appended claims.

What is claimed is:

1. A syngas cooler comprising:
    an outer wall defining a cavity;
    an inner membrane water wall positioned within said cavity;
    an outer membrane water wall substantially concentrically aligned with said inner membrane water wall, such that said outer membrane water wall is positioned between said inner membrane water wall and said outer wall;
    at least one half pipe having a semicircular cross-section directly coupled to an inner surface of said outer membrane water wall; and
    a thermal siphon positioned between said inner membrane water wall and said outer wall, said thermal siphon configured to channel a flow of syngas therethrough to facilitate cooling the channeled syngas.

2. A syngas cooler in accordance with claim 1 further comprising a middle membrane water wall substantially concentrically aligned with said outer membrane water wall, wherein said middle membrane water wall is positioned between said inner and said outer membrane water walls.

3. A syngas cooler in accordance with claim 2 further comprising a lockhopper coupled to said outer wall for collecting slag contained in the injected syngas.

4. A syngas cooler in accordance with claim 2 further comprising a first angled wall extending inward from said inner membrane water wall, and a second angled wall coupled to said first angled wall, said first angled wall and said second angled wall are configured to promote recirculation of the syngas.

5. A syngas cooler in accordance with claim 2 further comprising first radial wing walls coupled between said inner membrane water wall and said middle membrane water wall, and second radial wing walls coupled between said middle membrane water wall and said outer membrane water wall.

6. A syngas cooler in accordance with claim 2 further comprising a ramming mix refractory coating layer coupled to a top section of said inner membrane water wall.

7. A syngas cooler in accordance with claim 2 further comprising at least one entry coupled to at least one of said inner membrane water wall, said outer membrane water wall, and said middle membrane water wall for channeling a flow of cooling fluid therethrough.

8. A syngas cooler in accordance with claim 2 further comprising a quench wall coupled to said outer membrane water wall for channeling the syngas from the thermal siphon to a quench chamber, wherein said quench chamber facilitates rapidly cooling the syngas.

9. A syngas cooler in accordance with claim 1, wherein said half pipe comprises a low alloy half pipe and a SiC coating.

10. A syngas cooler in accordance with claim 1 further comprising a gasifier positioned within a top portion of said inner membrane water wall and configured to channel hot syngas downward inside said inner membrane water wall.

11. A gas turbine engine system comprising:
    a compressor;
    a combustor in flow communication with said compressor to receive at least some of the air discharged by said compressor; and
    a syngas cooler coupled in flow communication with said combustor for channeling a flow of syngas to said combustor, said syngas cooler comprising:
    an outer wall defining a cavity;
    a inner membrane water wall positioned within said cavity;
    a outer membrane water wall substantially concentrically aligned with said inner membrane water wall, such that said outer membrane water wall is positioned between said inner membrane water wall and said outer wall;
    at least one half pipe having a semicircular cross-section directly coupled to an inner surface of said outer membrane water wall; and
    a thermal siphon positioned between said inner membrane water wall and said outer wall, said thermal siphon configured to channel the syngas therethrough to facilitate cooling the channeled syngas.

12. A gas turbine engine system in accordance with claim 11, wherein said syngas cooler further comprises a middle membrane water wall substantially concentrically aligned with said outer membrane water wall, wherein said middle membrane water wall is positioned between said inner and said outer membrane water walls.

13. A gas turbine engine system in accordance with claim 12, wherein said syngas cooler further comprises a quench wall coupled to said outer membrane water wall for channeling the syngas from the thermal siphon to a quench chamber, wherein said quench chamber facilitates rapidly cooling the syngas.

14. A gas turbine engine system in accordance with claim 11, wherein said syngas cooler further comprises a gasifier positioned within a top portion of said inner membrane water wall and configured to channel hot syngas downward inside said inner membrane water wall.

15. A gas turbine engine system in accordance with claim 11, further comprising a heat exchanger coupled between said syngas cooler and a syngas scrubber, wherein said syngas cooler channels a first flow of syngas to said heat exchanger, said syngas scrubber channels a second flow of syngas to said heat exchanger for transferring heat from said first flow of syngas to said second flow of syngas.

16. A method for cooling syngas produced in a gasifier and separating slag and particulate matter from the syngas, the method comprising:
    surrounding a flow of syngas with three concentric, vertically oriented membrane water walls inside a syngas cooling unit;
    channeling cooling fluid through the three concentric membrane water walls;
    passing the syngas down through a first of the three membrane water walls to partially cool the syngas and separate slag and particulate matter from the syngas; and
    utilizing a thermal siphon to pass the partially cooled syngas up between the first of the three membrane water walls and a second of the three membrane water walls and then down between the third of the three membrane water walls and the second of the three membrane water walls to produce cooled output syngas;
    wherein at least one half pipe having a semicircular cross-section is directly coupled to an inner surface of said third membrane water wall.

17. A method in accordance with claim 16 further comprising using the cooled output syngas to generate electrical power.

18. A method in accordance with claim 17 wherein using the syngas to generate electrical power comprises burning the cooled output syngas to produce hot, high pressure gas.

19. A method in accordance with claim 18 wherein using the syngas to generate electrical power further comprises channeling the hot, high pressure gas and compressed air from a compressor over a turbine to power a first electrical generator.

20. A method in accordance with claim 19 further comprising operating a second generator using waste heat from the turbine.

* * * * *